United States Patent [19]

Imai et al.

[11] Patent Number: 5,220,814

[45] Date of Patent: Jun. 22, 1993

[54] CLOTHES WASHING MACHINE

[75] Inventors: Masahiro Imai, Seto; Yosiyuki Makino, Nagoya; Hiroshi Ikeda, Seto, all of Japan

[73] Assignee: Kabushiki Kaisha Toshiba, Kanagawa, Japan

[21] Appl. No.: 892,266

[22] Filed: Jun. 2, 1992

Related U.S. Application Data

[62] Division of Ser. No. 739,331, Aug. 1, 1991.

[30] Foreign Application Priority Data

Aug. 28, 1990 [JP] Japan ................................. 2-226917

[51] Int. Cl.$^5$ ............................................. D06F 33/02
[52] U.S. Cl. .................................................. 68/12.02
[58] Field of Search ................ 68/12.01, 12.02, 12.04, 68/12.27; 318/282, 434; 361/31, 33

[56] References Cited

FOREIGN PATENT DOCUMENTS

0117794 5/1988 Japan .................................. 68/12.01
0122499 5/1988 Japan .................................. 68/12.01

Primary Examiner—Philip R. Coe
Attorney, Agent, or Firm—Limbach & Limbach

[57] ABSTRACT

A clothes washing machine includes an agitator driven for agitating clothes to be washed, a dc brushless motor for driving the agitator and a microcomputer-based control device. A voltage applied to the motor can be varied in accordance with a voltage value command delivered from the control device. The number of revolution of the motor is detected and compared with a reference number of revolution for determination of whether the motor is locked or not. When the control device sequentially detects at a predetermined number of times that the number of revolution of the motor is equal to or below the reference number of revolution or below, it is determined that the motor is locked.

2 Claims, 7 Drawing Sheets

CLOTHES WASHING MACHINE

This is a divisional of application Ser. No. 07/739,331, filed Aug. 1, 1991.

BACKGROUND OF THE INVENTION

This invention relates to a clothes washing machine wherein a drive motor for driving an agitator and a rotational tub is driven at a target number of revolution.

An agitator is provided in a rotational tub serving both as a washing tub and a dehydrating tub, for example, in full automatic clothes washing machines. The agitator is rotated alternately forward and backward by a drive motor in a washing step while the rotational tub and the agitator are rotated by the drive motor in a dehydration step. It has recently been proposed that a brushless motor be employed as the drive motor in the above-described type clothes and that the brushless motor be driven at a target number of revolution by an inverter drive circuit. More specifically, a microcomputer-based control device is provided for controlling various loads of the clothes washing machine based on inputs from switches in accordance with a previously stored operation program. The control device comprises a revolution command section for commanding a target number of revolution to drive the motor at it and a voltage command section for supplying the inverter drive circuit with the voltage applied to the motor based on the command from the revolution command section. A revolution detecting section is also provided for detecting the number of revolution of the motor so that a feedback control is performed based on the detected number of revolution of the motor.

The drive motor needs to be deenergized immediately when locked for the reason, for example, that clothes are caught in between the agitator and the rotational tub during the washing operation. Further, the user needs to be warned against such an abnormal condition. In this case it is generally considered that whether or not the number of revolution of the motor can reach a predetermined value can be determined for the purpose of detecting such a locked motor condition. However, an amount of load applied to the motor is varied because of the position of the clothes in the rotational tub or the like, resulting in unevenness in the number of revolution. Consequently, it is difficult to detect the locked motor condition with reliability or to determine whether the locked motor condition is temporary and safe or continuous and dangerous.

Further, in the feedback control of the motor revolution, the number of revolution detected by the motor speed detecting section is compared with the target number of revolution at that time. The voltage applied to the motor is increased by a predetermined value when the detected number of revolution is smaller than the target number of revolution while the applied voltage is decreased by a predetermined value when the detected number of revolution is larger than the target number of revolution. However, the number of revolution of the motor is sometimes changed suddenly depending upon the position of the clothes in the rotational tub as described above or when the clothes are put into or taken out of the rotational tub during the washing operation. In such a case the conventional feedback control requires much time for the motor to reach the target number of revolution.

SUMMARY OF THE INVENTION

Therefore, a primary object of the present invention is to provide a clothes washing machine which is provided with a drive motor driven at the target number of revolution and wherein the occurrence of the locked motor condition can be detected with reliability.

A second object of the invention is to provide a clothes washing machine which is provided with a drive motor driven at a target number of revolution and wherein the number of revolution of the drive motor can be promptly controlled so as to reach the target number of revolution.

The present invention provides a washing machine comprising an agitator driven for agitating clothes to be washed, a motor for driving the agitator, motor drive control means for controlling a voltage applied to the motor in accordance with a voltage value command, revolution detecting means for detecting the number of revolution of the motor, revolution command means for producing a command of a target number of revolution for the motor, voltage command means for supplying the motor drive control means with a value of voltage applied to the motor based on the command of the target number of revolution output by the voltage command means, and locked motor condition detecting means sequentially comparing the number of revolution of the motor detected by the revolution detecting means with a reference number of revolution at predetermined intervals for determination of the locked motor condition, the locked motor condition detecting means determining that the motor has been locked when continuously detecting at a predetermined number of times that the number of revolution is equal to or below the reference number of revolution.

Based on the command from the revolution command means, the voltage command means supplies the motor drive control means with a command of voltage to be applied to the motor. Consequently, the motor is driven at the target number of revolution. If the motor is locked for some reason, the locked motor condition is detected by the locked motor detecting means.

The number of revolution of the motor sequentially detected by the revolution detecting means is compared with the reference number of revolution in turn by the locked motor condition detecting means at predetermined intervals for determination of the locked motor condition. When the locked motor condition detecting means sequentially detects at the predetermined number of times that the number of revolution of the drive motor is decreased to the reference number of revolution or below, it is determined that the motor has been locked. Accordingly, it is not determined that the drive motor is not determined as being in the locked motor condition, from a temporary drop of the motor revolution such as the unevenness in the revolution due to load variations of the drive motor. Consequently, the locked motor condition can be detected with reliability.

The drive motor may preferably comprise a dc brushless motor and the motor drive control means may have a switching element turned on and off so that the voltage applied to the dc brushless motor is varied. Since the dc brushless motor is employed as the drive motor, it can be controlled so as to be driven at the target number of revolution with accuracy.

In the case where the motor in inertial rotation is started to be rotated in the direction opposite that of the inertial rotation, the inertial rotation generates a regenerative power when the motor is energized. This regenerative power causes an off-action of the switching element to be delayed in the arrangement that the voltage applied to the dc brushless motor is varied by turning on and off the switching element, resulting in short-circuit of the switching element. Consequently, a short-circuit current flows into the switching element, which is broken.

According to another aspect of the invention, starting control means is provided for controlling the dc brushless motor so that the dc brushless motor is prevented from starting until the motor speed of the dc brushless motor in the inertial revolution is reduced to a predetermined value or below. Consequently, even when the motor is in the inertial rotation in the direction opposite that of the starting, the motor is not started until the motor revolution speed is reduced to the predetermined value or below. The magnitude of the regenerative power generated at the starting of the motor can be reduced, which prevents the switching element off action from being delayed. Thus, the switching element can be prevented from being short-circuited and accordingly, from being broken.

In accordance with further another aspect of the invention, setting means is provided for setting the reference number of revolution for determination of the locked motor condition in accordance with the target number of revolution. When the target number of revolution is varied in accordance with the water level or material of the clothes, the reference number of revolution for determination of the locked motor condition can also be varied accordingly. Consequently, the locked motor condition can be accurately detected with the water level or water stream taken into consideration.

In accordance with further another aspect of the invention, voltage value command changing means is provided for comparing the number of revolution of the motor detected by the revolution detecting means with the target number of revolution produced by the revolution command means. The voltage value command changing means changes the voltage value command produced by the voltage command means in accordance with the difference between the number of revolution of the motor and the target number of revolution. When the difference between the detected number of revolution of the motor and the target number of revolution is relatively large, the voltage applied to the motor can be increased or decreased by the voltage value command changing means in a degree larger than in the case where the revolution difference is small. Consequently, the target number of revolution of the motor can be reached in a short period of time even when the number of revolution of the motor is suddenly changed.

The voltage value command changing means may change the voltage value command stepwise in accordance with the difference between the number of revolution of the motor and the target number of revolution.

Other objects of the present invention will become obvious upon understanding of the illustrative embodiments about to be described or will be indicated in the appended claims. Various advantages not referred to herein will occur to one skilled in the art upon employment of the invention in practice.

DESCRIPTION OF THE PREFERRED EMBODIMENTS

A first embodiment wherein the invention is applied to a full automatic clothes washing machine will now be described with reference to FIGS. 1 to 6 of the accompanying drawings. An electrical arrangement of the washing machine is schematically shown in FIG. 2. The washing machine comprises a rotational tube (not shown) mounted within an outer cabinet (not shown) for both of the washing and dehydration. Clothes to be washed is contained in the rotational tub (not shown). The washing machine is provided with a water supply value 1 for supplying water to the rotational tube and a drain valve 2 for discharging the wash liquid. An agitator (not shown) is mounted in the rotational tub for causing water streams for the washing. The agitator is rotated forward and backward alternately by the drive motor 3 repeatedly in a wash step. The rotational tub and the agitator are simultaneously rotated by the drive motor 3 in a dehydration step. Various switches 4 and a display section 5 for displaying the washing period of time, the washing course and the like are provided in the top of the outer cabinet. These switches 4 include selection switches for the user to select a desired washing course and a start switch.

A microcomputer-based control device 6 is supplied with signals from the switches 4, a water level sensor 7 sensing the water level in the rotational tub and the like. Based on these input signals, the control device 6 controls the water supply valve 1, the drain valve 2, the display section 5 and the like in accordance with an operation program previously stored in it. The control device 6 further controls the drive motor 3 via a motor drive control circuit 8 as motor drive control means so that the steps of the washing operation are performed, as will be described later.

Figure 3:
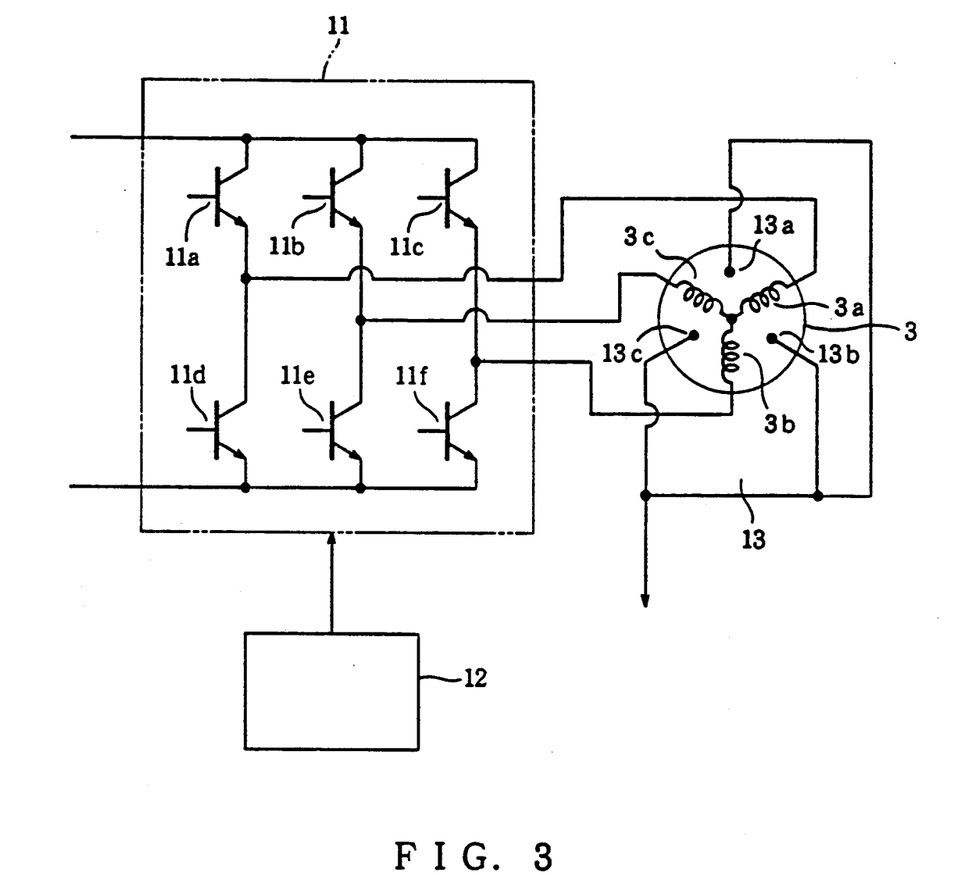
FIG. 3 shows an electrical arrangement of the control circuit connected to the motor.
Figure 4:
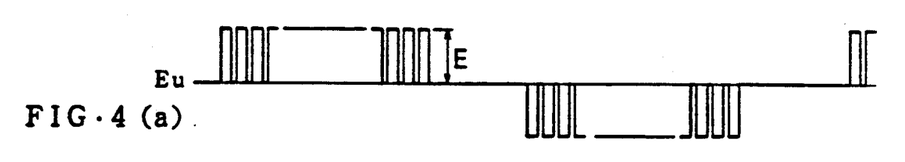
FIGS. 4(a) to 4(c) are waveform charts showing output waveforms of a motor drive control circuit.

A power feed circuit for the drive motor 3 will be described. A dc power supply circuit 10 comprising a diode bridge and a smoothing capacitor is connected to an ac power source 9. The dc output of the dc power supply circuit 10 is supplied to a drive circuit 11 forming a part of the motor drive control circuit 8. A dc brushless motor having coils 3a, 3b and 3c of respective phases U, V and W is employed as the drive motor 3, for example, as shown in FIG. 3. The drive circuit 11 includes six switching elements 11a to 11f each comprising a transistor, for example. Voltages Eu, Ev and Ew are applied to the respective phase coils 3a-3c in an application pattern that the voltages Eu, Ev and Ew are shifted from one another by 120 degrees in the electrical angle. In this case the voltage (effective voltage) applied to the drive motor 3 is determined by the pulse width modulation (PWM) control of the maximum voltage E and therefore, proportional to the duty ratio.

The energization timing for the drive motor 3 and the PWM control are controlled by the control circuit 12 forming a part of the motor drive control circuit 8. The control circuit 12 operates to set the duty cycle of the PWM control based on the voltage value command from the control device 6. The control circuit 12 operates to further set the energization timing based on a position signal from a position sensor 13 sensing the rotational position of the drive motor 3 and comprising, for example, a Hall IC. More specifically, the position sensor 13 is composed of three position sensing elements 13a to 13c, as shown in FIG. 3. Consequently, the motor drive control circuit 8 is capable of varying the voltage applied to the drive motor 3 in accordance with the voltage value command. In this case the voltage applied to the drive motor 3 is varied by turning on and off the switching elements 11a-11f.

The control device 6 also delivers to the control circuit 12 operation start and stop signals and forward and backward rotation signals for the drive motor 3. The position signal from the position sensor 13 is also supplied to the control device 6. Thus, the position sensor 13 constitutes, with the control device 6, revolution detecting means for detecting the number of revolution of the drive motor 3 or the rotational speed of the same.

The control device 6 operates to control various mechanisms in accordance with the previously stored program so that the washing operation is performed, as described above. In addition, the control device 6 is arranged in the software arrangement to serve as revolution command means, voltage command means, locked motor condition detecting means, starting control means and reference revolution setting means for determining the locked motor condition as well as the above-described revolution detecting means.

The revolution command means is arranged to produce a command of a target number of revolution of the drive motor 3. The target number of revolution differs depending upon a washing course selected by the user with the selecting switch. The control device 6 has a memory for storing data of the previously set target number of revolution in each washing course. The drive motor 3 is rotated forward and backward alternately in the wash step, and the number of revolution of the drive motor 3 is increased stepwise at each rise time so as to reach the target number of revolution. Accordingly, the command of the number of revolution or the voltage signal output from the revolution command means is sequentially increased from N1 to N2, N3 and so on in turn to reach the command N4 of the target number of revolution. Based on the target number of revolution from the revolution command means and the actual number of revolution detected by the revolution detecting means, the voltage command means operates to determine the value of voltage applied to the drive motor 3 and output the determined voltage value to the control circuit 12 of the motor drive control circuit 8.

Figure 5:
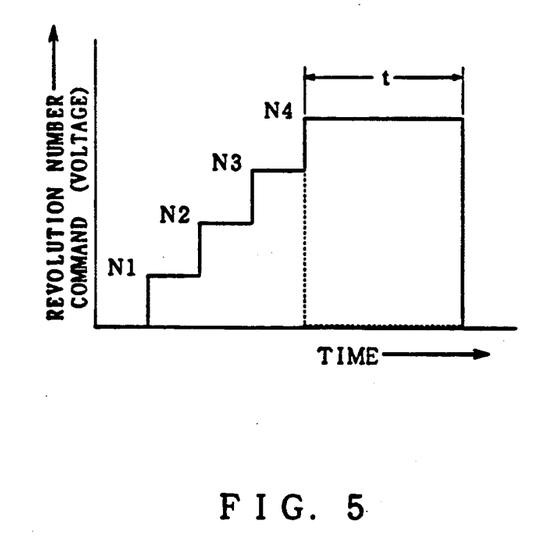
FIG. 5 is a graph showing changes in commands of the number of revolution of the motor.

The locked motor condition detecting means sequentially compares the number of revolution of the drive motor 3 sequentially detected by the revolution detecting means with the reference number of revolution a at intervals of a predetermined unit period of time t for the determination of the locked motor condition, as will be described in detail later. In the case where it is detected that the number of revolution of the drive motor 3 is below the reference revolution number a and such a detection result is sequentially obtained by a predetermined number of times, for example twelve times, it is determined that the drive motor 3 has been locked The drive motor 3 is deenergized immediately upon determination of the locked motor condition and a buzzer (not shown) is activated to inform the user of the failure. The reference revolution number a for determination of the locked motor condition is set by reference revolution number setting means to the value one tenth of the target number of revolution at that time, for example. The above-mentioned unit time period t is set to such a value as to correspond to the period between the time the target revolution command N4 in accordance with the target number of revolution is output during one forward or backward turn of the drive motor in the wash operation and the time the drive motor 3 is deenergized, as shown in FIG. 5.

In the case of the above-described drive circuit 11 comprising the switching elements 11a-11f, the off action of the switching elements is sometimes delayed because of a regenerative power generated as the result of the inertial rotation of the drive motor 3 when the motor is switched between the forward and backward rotation. Consequently, the switching elements 11a-11f are short-circuited and the resultant short-circuit current would break the switching elements. To overcome this disadvantage, in the embodiment, the drive motor 3 is controlled by the starting control means so that the motor 3 is not energized until it reaches a predetermined number of revolution when it is switched between the forward and backward rotation.

Figure 6A:
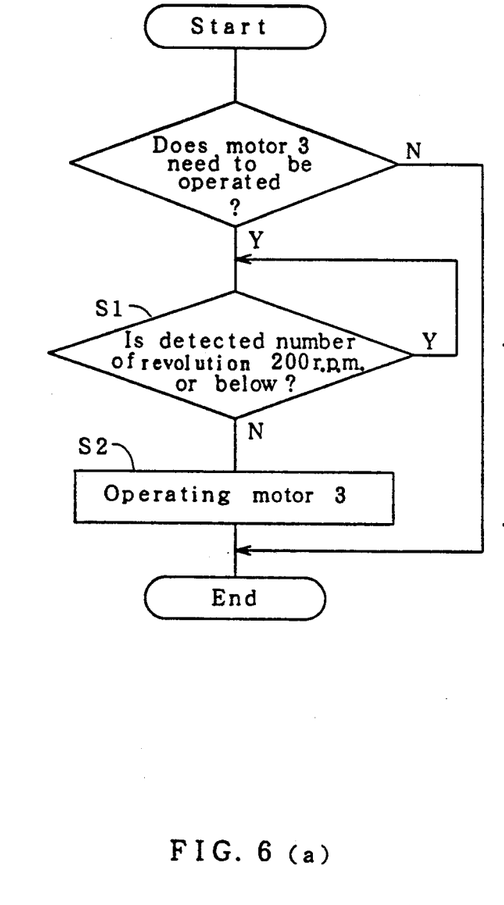
FIGS. 6(a) and 6(b) are flowcharts for explaining "on" and "off" control manners for the motor when the motor is started and when the motor is rotated alternately forward and backward, respectively.
Figure 6B:
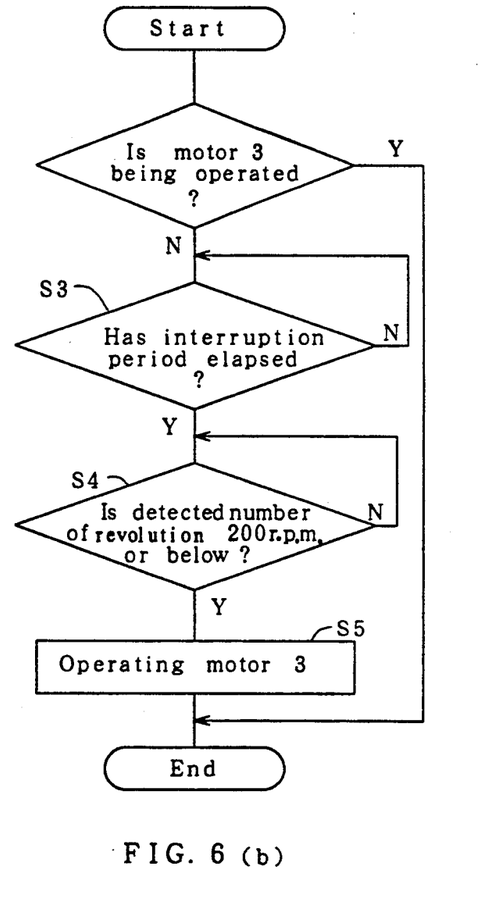

The operation of the washing machine thus arranged will be described. Upon start of the washing operation, the control device 6 controls the drive motor 3 via the motor drive control circuit 8 in accordance with the operation program so that it is alternately rotated forward and backward repeatedly. Consequently, the agitator is alternately rotated forward and backward repeatedly in order that the washing operation is performed. For example, in the case of a STANDARD course, the drive motor 3 is driven in a sequence of the forward rotation for 1.3 second, an interruption for 0.7 second, the backward rotation for 1.3 second and the interruption for 0.7 second. The control device 6 outputs to the motor drive control circuit 8 the commands of drive and stop and the commands of forward and backward rotation and is supplied with the voltage value command determined by the voltage command means. In addition, the revolution command is increased stepwise from N1 to N2 and N3 in turn at each rise time of the forward and backward rotation of the motor 3 so as to reach the command N4 of the target number of revolution. In this case the drive motor 3 is not energized until the number of revolution of the motor detected by the revolution detecting means is reduced to 200 r.p.m.(corresponding to 20 r.p.m. of the agitator) or below when the motor is started and when the motor is switched between the forward and backward rotation, as shown in FIGS. 6(a) and 6(b). More specifically, when the drive motor 3 is started, it is started (step S2) on the condition that the number of revolution detected by the revolution detecting means is 200 r.p.m. or below (step S1), as shown in FIG. 6(a). In the case where the drive motor 3 is switched between the forward and backward rotation, the drive motor 3 is not energized when the number of revolution of the motor 3 is above 200 r.p.m. (step S4) even after the interruption period of 0.7 second elapses (step S3). The motor 3 is energized (step S5) after the number of revolution is reduced to 200 r.p.m. or below (step S4). Thus, the drive motor 3 is not started until the number of revolution of the motor is reduced to the predetermined value or below or the rotational speed of the agitator is reduced to 20 r.p.m. or below even when the motor 3 is in the inertial rotation in the direction opposite that in which it is started. Consequently, the regenerative power produced at the start of the drive motor 3 can be reduced. Accordingly, the switching elements 11a–11f of the drive circuit 11 energizing the drive motor 3 at the time of start can be prevented from being short-circuited, which can prevent the switching elements from being broken.

Figure 1:
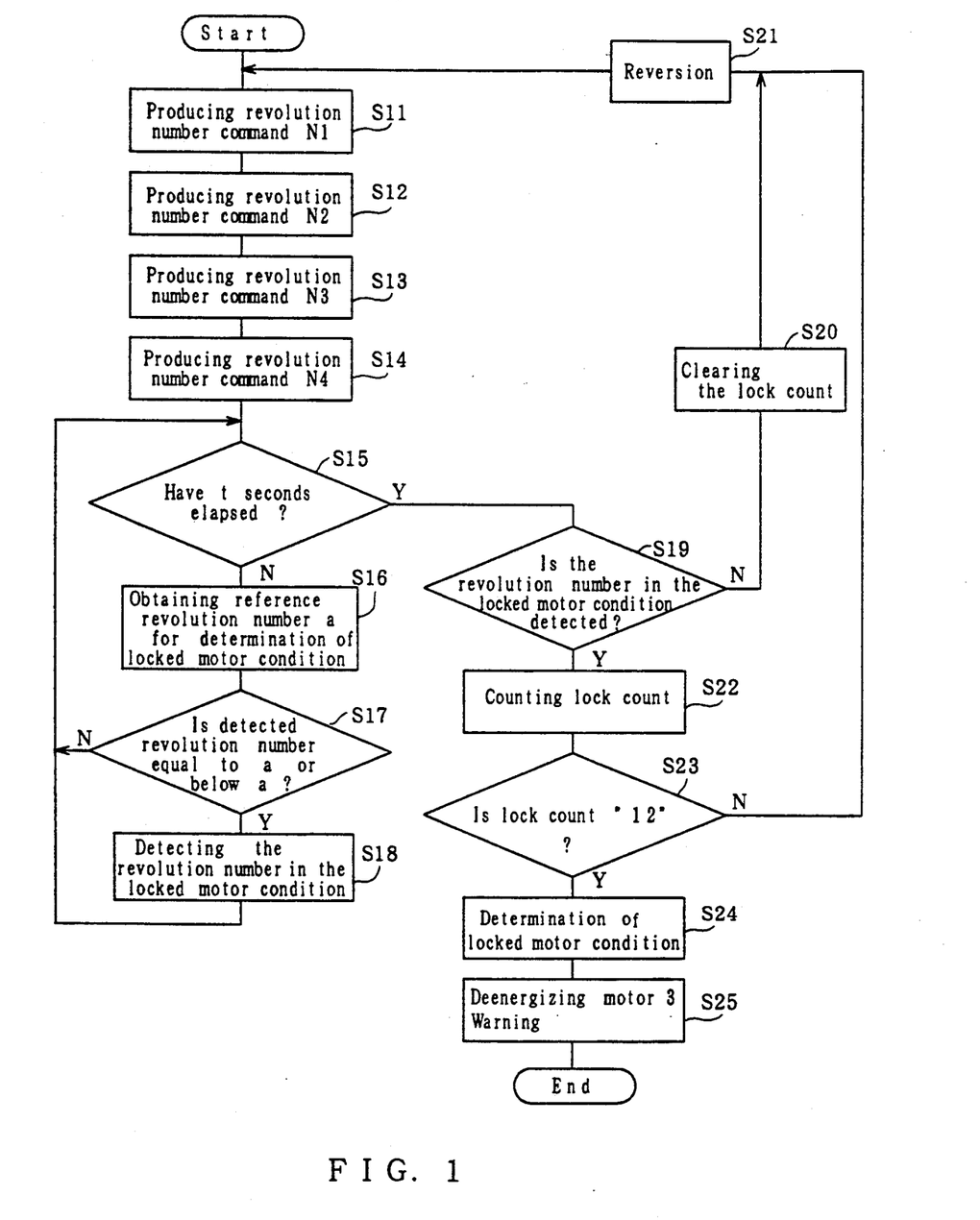
FIG. 1 is a flowchart for explaining the locked motor condition in the washing machine of a first embodiment in accordance with the present invention.
Figure 2:
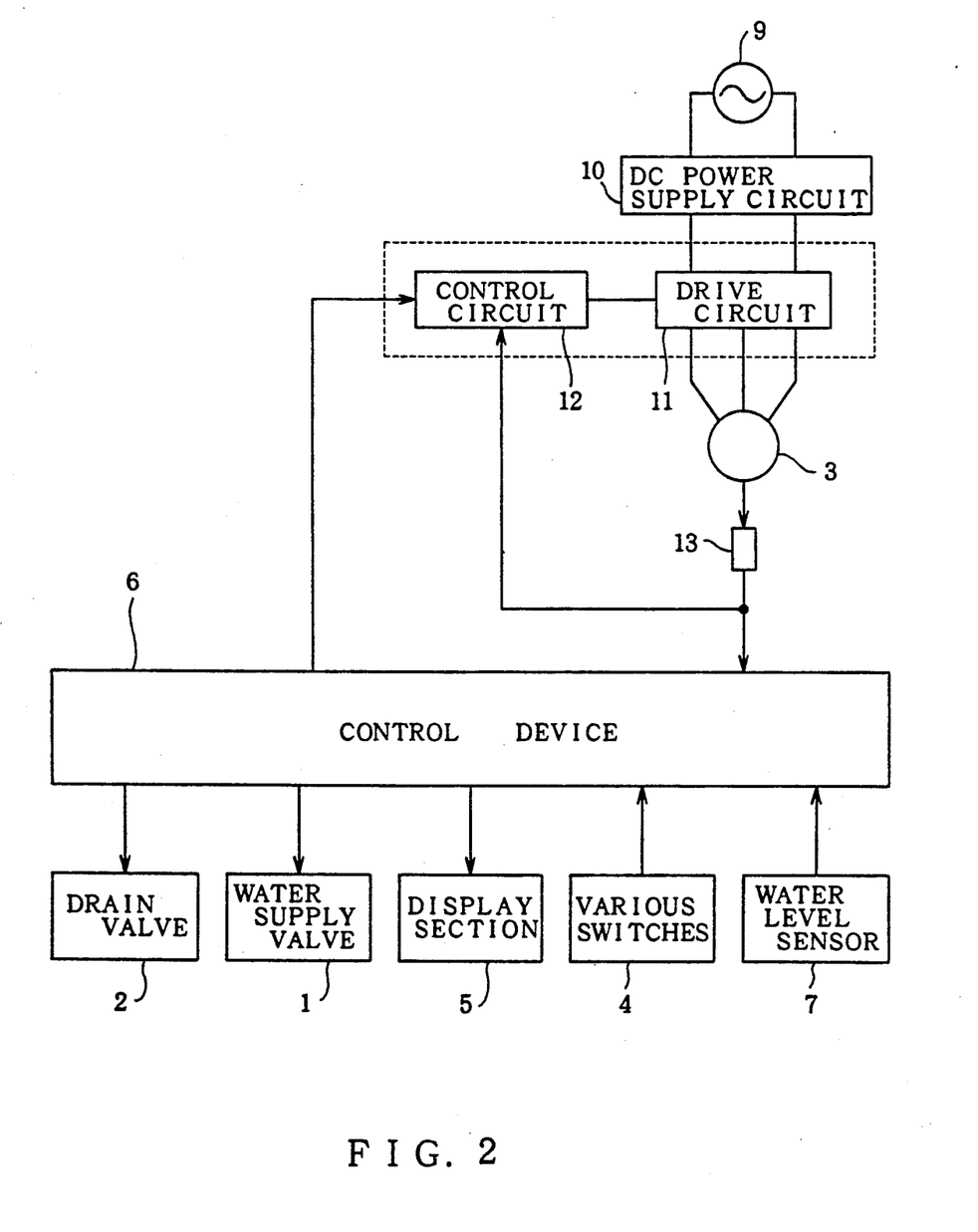
FIG. 2 is a block diagram showing an overall electrical arrangement of the washing machine.

The drive motor 3 is monitored by the locked motor condition detecting means during its operation as to whether or not the motor 3 is locked, as shown in FIG. 1. More specifically, the revolution command means sequentially delivers the revolution commands N1, N2, N3 and N4 (corresponding to the target number of revolution) at the rise time of the forward or backward rotation of the motor 3 (steps S11 to S14). The duration of the target revolution command N4 is a period of t seconds as shown in FIG. 5 and subsequently, the command signals are output for the following backward or forward rotation with a period of interruption.

In detecting the locked motor condition with respect to the drive motor 3, the number of revolution of the motor 3 detected by the revolution detecting means is compared with the reference number of revolution a within a unit period which is a period of t seconds after output of the revolution command N4 (step S15). The reference number of revolution a for determination of the locked motor condition is obtained from the target number of revolution at step S16 where a=the target number of revolution/10 and then, the detected number of revolution of the motor 3 is compared with the reference number of revolution a at step S17. When the detected number of revolution of the motor 3 is equal to the reference number of revolution a or below, it is determined that the motor 3 is in the locked motor condition at step S18. When the number of revolution in the locked motor condition is detected, the revolution command to deenergize the motor 3 is output so that the current supply to the motor 3 is interrupted, as shown by a broken line in FIG. 5.

Subsequently, after lapse of t seconds, it is determined whether or not the number of revolution in the locked motor condition was detected in the period of t seconds, at step S19. When it is determined that the number of revolution in the locked motor condition is not detected, the lock count counted at step S22 is cleared to zero at step S20. The control then advances to the subsequent reversing operation of the motor 3 (step S21), and the procedure beginning at step S11 is performed with respect to the backward rotation of the motor 3.

On the other hand, when it is determined that the number of revolution in the locked motor condition is detected at step S18, the lock count is increased by one count at step S22. Then, it is determined whether or not the lock count has reached "12" at step S23. In the case where the lock count has not reached "12", it is not determined that the motor 3 is in the locked motor condition and the control advances to the subsequent reversing operation of the motor 3 (step S21). When the number of revolution in the locked motor condition is detected and the same detection result is continuously obtained at predetermined times, for example 12 times, the lock count is increased to "12" without being cleared and then, it is determined at step S23 that the lock count has reached "12". Consequently, the control device 6 (locked motor condition detecting means) determines that the motor 3 has been locked at step S24, interrupting energization of the motor 3 and activating the buzzer to inform the user of the failure (step S25). The locked motor condition can be detected within about 30 seconds in the above-described control manner.

In accordance with the above-described arrangement, the voltage command means supplies the motor drive control means with the command of voltage value to be applied to the motor 3 based on the command from the revolution command means, so that the motor 3 can be driven at the target number of revolution. Further, the locked motor condition can be detected by the locked motor condition detecting means with reliability. More specifically, the detected number of revolution of the motor 3 is compared with the reference number of revolution for determination of the locked motor condition at predetermined intervals. When the number of revolution in the locked motor condition is detected and the detection of the locked motor condition continues at 12 times, it is determined that the motor 3 has been locked. Consequently, even when the motor load fluctuation due to the position of the clothes in the rotational tub or others causes unevenness of the number of revolution of the motor 3, it is not determined that the motor has been locked, from such a temporary reduction of the number of revolution. As a result, the locked motor condition can be detected with reliability.

The water level, water stream mode and the like are set in accordance with an amount of clothes to be washed, difference in the quality of the clothes materials. In this case the target number of revolution of the motor 3 is also changed. Since the reference number of revolution for determination of the locked motor condition is set in accordance with the variable target number of revolution, the detection of the locked motor condition is not influenced by the water level and the water stream mode as compared with the case where the reference number of revolution is fixed. Consequently, an accurate detection of the locked motor condition can be performed in consideration of the water level and the water stream mode. In addition, since the target number of revolution of the motor 3 is also changed in accordance with the selected washing course, the detection of the locked motor condition can also be performed accurately in consideration of the washing courses.

Although the reference revolution number a for determination of the locked motor condition is set in accordance with the target number of revolution in the above-described embodiment, it may be previously set to a fixed value. The unit period t and the number of counting operations for determination of the locked motor condition may be changed suitably.

Figure 7:
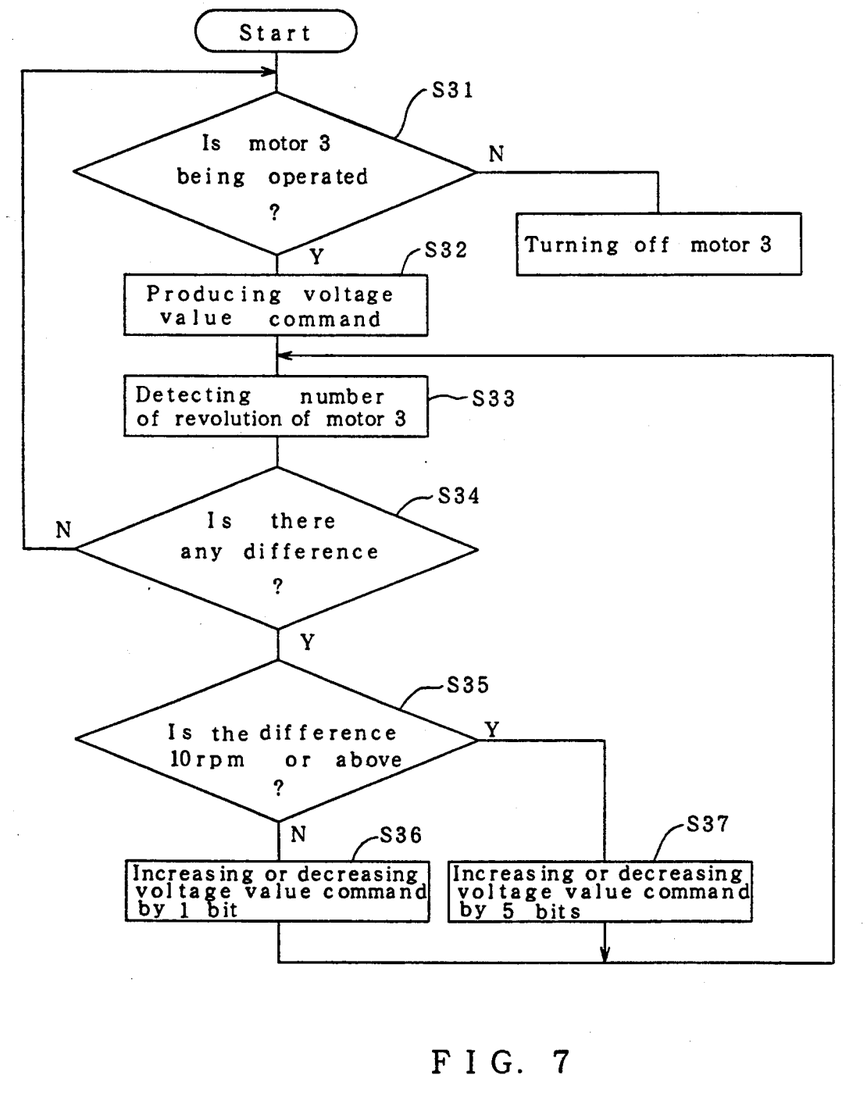
FIG. 7 is a flowchart for explaining a voltage value command changing manner in the washing machine of a second embodiment.
Figure 8:
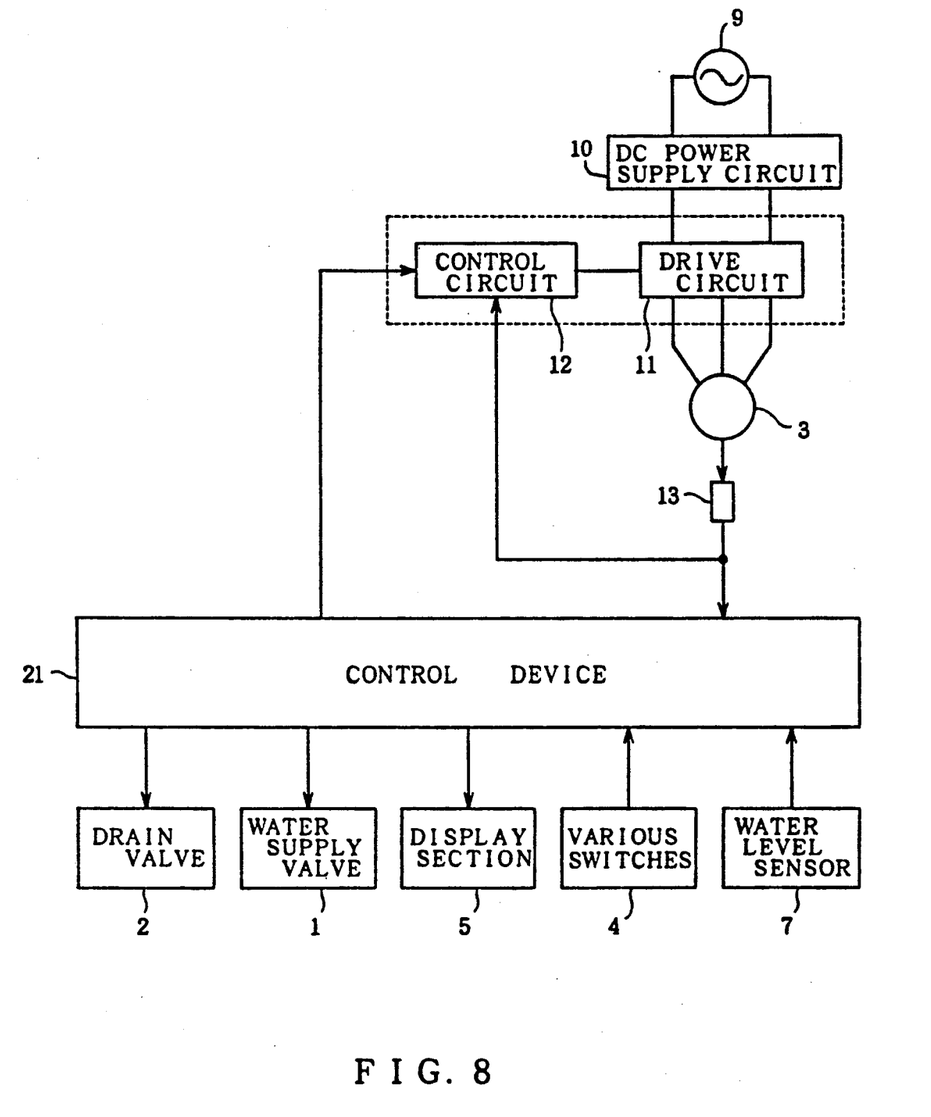
FIG. 8 is a block diagram showing an overall electrical arrangement of the washing machine.

FIGS. 7 and 8 illustrate a second embodiment of the invention. Referring to FIG. 8, the drive motor 3 rotating the agitator and the rotational tub is driven under control of the motor drive control circuit 8 as the motor drive control means so that the voltage applied to the motor 3 can be varied in accordance with the voltage value command. The motor drive control circuit 8 comprises the drive circuit 11 to which a dc output is supplied via the dc power supply circuit from the ac power source 9 and the control circuit 12 which performs switching of the drive circuit 11 to execute timing of the energization of the motor 3 and the PWM control. The motor 3 is provided with the position sensor 13 for sensing the rotational position of the motor 3. The timing of energization of the motor drive control circuit 8 is specified based on the position signal from the position sensor 13. The position signal from the position sensor 13 is supplied to the control device 21 and the position sensor 13 constitutes a part of the revolution detecting means for detecting the number of revolution of the motor 3.

The microcomputer-based control device 21 is supplied with signals from the switches 4, the water level sensor 7 and the like. Based on these input signals, the control device 21 controls the water supply valve 1, the drain valve 2, the display section 5 and the like in accordance with the operation program previously stored in it. The control device 21 further controls the drive motor 3 via the motor drive control circuit 8 as motor drive control means so that the steps of the washing operation are performed. The control device 21 also delivers to the control circuit 12 the command of voltage value applied to the motor 3, operation start and stop signals and forward and backward rotation signals for the drive motor 3.

The control device 21 operates to control various mechanisms in accordance with the previously stored program so that the washing operation is performed, as described above. In addition, the control device 21 is arranged in the soft ware arrangement to serve as revolution command means, voltage value command means and voltage value command changing means as well as the above-described revolution detecting means.

The revolution command means is arranged to output a command for the target number of revolution of the drive motor 3. The target number of revolution differs depending upon a selected washing course. Based on the command of the target number of revolution from the revolution command means, the voltage command means operates to determine the value of voltage applied to the drive motor 3 and output the determined voltage value to the control circuit 12 of the motor drive control circuit 8.

The voltage value command changing means compares the number of revolution of the motor 3 detected by the revolution detecting means with the target number of revolution output from the revolution command means and changes the voltage value command from the voltage value command means in accordance with the difference between them. When the difference between the detected number of revolution and the target number of revolution is relatively large, for example 10 r.p.m. or more, the voltage applied to the motor 3 is increased or reduced by an amount larger than in the case where the difference is below 10 r.p.m.

In the second embodiment, the voltage value command is output from the control device 21 in the manner as shown in FIG. 7. More specifically, when the drive motor 3 is driven, the voltage value command is supplied to the motor drive control circuit 8 from the voltage value command means based on the target number of revolution output from the revolution command means (step S32), thereby driving the motor 3. Then, the number of revolution of the motor 3 is detected by the revolution detecting means (step S33). The detected number of revolution is compared with the target number of revolution at step S34. When there is no difference between the detected number of revolution and the target number of revolution, the voltage value command is maintained at the value at that time since the motor 3 is being driven at the target number of revolution. On the other hand, when there is some difference between the detected number of revolution and the target number of revolution, it is determined whether the difference is small or large (step S35). When the difference is small or below 10 r.p.m., the output of the voltage value command is increased or decreased by 1 bit, for example, at step S36. In this case when the detected number of revolution is smaller than the target number of revolution, the voltage applied to the motor 3 is increased while it is decreased when the detected number of revolution is larger than the target number of revolution.

When the difference between the detected number of revolution and the target number of revolution is large or 10 r.p.m. or above, the output of the voltage value command is increased or decreased by 5 bits, for example, at step S37. After the voltage value command is changed in the manner as described above, the number of revolution of the motor 3 is again detected. The detected number of revolution is then compared with the target number of revolution so that the number of revolution of the motor 3 is controlled in the manner as described above. The above-described control manner is performed both in the forward and backward rotation of the motor 3.

Consequently, when the difference between the detected number of revolution and the target number of revolution is large, the voltage applied to the motor 3 is increased or decreased by an amount larger than in the case where the difference is small. As a result, the target number of revolution can be reached by the drive motor 3 in a short period of time.

Differing from the conventional arrangement wherein the applied voltage is increased or decreased by a predetermined value by the feedback control, the target number of revolution of the motor 3 can be reached in a short period of time even when the position of the clothes in the rotational tub or another cause rapidly changes the number of revolution of the motor 3.

Although the voltage value command is changed in two stages in the foregoing embodiment, it may be changed in three or more stages.

The foregoing disclosure and drawings are merely illustrative of the present invention and are not to be interpreted in a limiting sense. The only limitation is to be determined from the scope of the appended claims.

We claim:

1. A washing machine comprising:
   a) an agitator driven for agitating clothes to be washed;
   b) a motor for driving the agitator;
   c) motor drive control means for controlling a voltage applied to the motor in accordance with a voltage value command;

d) revolution detecting means for detecting the number of revolution of the motor;
e) revolution command means for producing a command of a target number of revolution for the motor
f) voltage command means for supplying the motor drive control means with a value of voltage applied to the motor based on the command of the target number of revolution produced by the voltage command means; and
g) voltage value command changing means comparing the number of revolution of the motor detected by the revolution detecting means with the target number of revolution produced by the revolution command means, the voltage value command changing means changing the voltage value command produced by the voltage command means in accordance with the difference between the number of revolution of the motor and the target number of revolution.

2. A washing machine according to claim 1, wherein the voltage value command changing means changes the voltage value command stepwise in accordance with the difference between the detected number of revolution of the motor and the target number of revolution.

* * * * *